United States Patent
Hackl et al.

(10) Patent No.: US 10,427,647 B2
(45) Date of Patent: *Oct. 1, 2019

(54) WINDSCREEN WIPER DEVICE

(71) Applicant: Robert Bosch GmbH, Stuttgart (DE)

(72) Inventors: Viktor Hackl, Sopron (HU); Michael Weiler, Buehl (DE); Peter Deak, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/328,569

(22) PCT Filed: Jul. 10, 2015

(86) PCT No.: PCT/EP2015/065790
§ 371 (c)(1),
(2) Date: Jan. 24, 2017

(87) PCT Pub. No.: WO2016/012266
PCT Pub. Date: Jan. 28, 2016

(65) Prior Publication Data
US 2017/0210344 A1      Jul. 27, 2017

(30) Foreign Application Priority Data

Jul. 24, 2014   (DE) .................. 10 2014 214 579

(51) Int. Cl.
B60S 1/34      (2006.01)
B60S 1/38      (2006.01)
(Continued)

(52) U.S. Cl.
CPC .......... B60S 1/3425 (2013.01); B60S 1/3436 (2013.01); B60S 1/3443 (2013.01); B60S 1/3459 (2013.01);
(Continued)

(58) Field of Classification Search
CPC ........ B60S 1/38; B60S 1/3425; B60S 1/3459; B60S 1/3436; B60S 1/3443; B60S 1/342;
(Continued)

(56) References Cited

U.S. PATENT DOCUMENTS 2,964,775 A * 12/1960 Krohm ...................... B60S 1/34
                                                  15/250.34
3,419,299 A * 12/1968 Oishei .................. B60S 1/3418
                                                  15/250.34
(Continued)

FOREIGN PATENT DOCUMENTS

CA        2895008 A1    6/2013
CN     102068360 A     5/2011
(Continued)

OTHER PUBLICATIONS

Machine translation of description portion of French publication 2103349, published Apr. 1972.*
(Continued)

*Primary Examiner* — Gary K. Graham
(74) *Attorney, Agent, or Firm* — Michael Best & Friedrich LLP (57) ABSTRACT

The present invention relates to a windscreen wiper device (100) for a vehicle, with a fastening element (52), in particular to a motor vehicle. The windscreen wiper device (100) comprises a mounting element (40) which is designed to be mounted on the fastening element (52), and a wiper blade (2) with an elongate upper part (10) and an elongate lower part (12), which are configured to be at least partially bendable. Furthermore, a plurality of connecting elements (18) for connecting the upper part (10) and the lower part (12) are provided, wherein the connecting elements (18) are spaced apart from one another along a longitudinal extent (8) of the wiper blade (2). The connecting elements (18) are designed to permit a movement of the upper part (10) and of (Continued)

the lower part (12) relative to one another with a movement component along a longitudinal extension (8) of the wiper blade (2). Furthermore, the wiper blade (2) comprises a wiper-blade-side fastening part (20). The wiper-blade-side fastening part (20) is configured in such a manner that, by means of a rotation of the wiper-blade-side fastening part (20) relative to the mounting element (40), an engagement can be formed in order to connect the wiper-blade-side fastening part (20) to the mounting element (40).

19 Claims, 4 Drawing Sheets

(51) Int. Cl.
    *B60S 1/40* (2006.01)
    *F16B 7/00* (2006.01)
    *F16B 7/20* (2006.01)

(52) U.S. Cl.
    CPC .............. *B60S 1/38* (2013.01); *B60S 1/3801* (2013.01); *B60S 1/40* (2013.01); *B60S 1/3427* (2013.01); *B60S 2001/3812* (2013.01); *F16B 7/00* (2013.01); *F16B 7/20* (2013.01); *Y10T 403/10* (2015.01); *Y10T 403/18* (2015.01); *Y10T 403/7005* (2015.01)

(58) Field of Classification Search
    CPC .... B60S 1/345; F16B 7/00; F16B 7/20; Y10T 403/43; Y10T 403/46; Y10T 403/10; Y10T 403/18; Y10T 464/40; Y10T 403/7005; Y10T 408/907; Y10T 408/95; Y10T 409/30952
    USPC .......... 15/250.34, 250.351, 250.352; 403/93, 403/94, 246; 464/182, 104, 105
    See application file for complete search history.

(56) References Cited

U.S. PATENT DOCUMENTS

| | | | |
|---|---|---|---|
| 4,439,886 | A | 4/1984 | Yagasaki et al. |
| 6,833,682 | B2 | 12/2004 | Buchanan, Jr. |
| 6,863,465 | B2 | 3/2005 | Brancheriau |
| 8,181,306 | B2 | 5/2012 | Merkel |
| 2006/0218740 | A1 | 10/2006 | Coughlin |
| 2011/0110716 | A1 | 5/2011 | Slater et al. |
| 2016/0159322 | A1* | 6/2016 | Weiler .................. B60S 1/3411 15/250.32 |

FOREIGN PATENT DOCUMENTS

| | | |
|---|---|---|
| CN | 102791407 A | 11/2012 |
| CN | 102865278 A | 1/2013 |
| CN | 202768576 U | 3/2013 |
| DE | 19731683 A1 | 1/1999 |
| DE | 19754449 A1 | 5/1999 |
| DE | 10007808 A1 | 9/2001 |
| DE | 102013214064 | 5/2014 |
| EP | 0625452 A1 | 11/1994 |
| FR | 2103349 * | 4/1972 |
| FR | 2899857 A1 | 10/2007 |
| FR | 3010366 A1 | 3/2015 |
| GB | 712452 | 7/1954 |
| JP | 63129658 | 8/1988 |
| JP | S63129658 U | 8/1988 |
| JP | H0542020 U | 6/1993 |
| JP | 2002098114 A | 4/2002 |
| JP | 2010048367 A | 3/2010 |
| WO | 2015071104 | 5/2015 |

OTHER PUBLICATIONS

Machine translation of decription portion of Japanese publication 2002098114, published Apr. 2002.*
International Search Report for Application No. PCT/EP2015/065790 dated Oct. 14, 2015 (English Translation, 2 pages).
International Search Report for Application No. PCT/EP2014/073273 dated Jan. 27, 2015 (English Translation, 3 pages).

* cited by examiner

WINDSCREEN WIPER DEVICE

BACKGROUND OF THE INVENTION

The invention relates to a windshield wiper device for a vehicle, in particular a motor vehicle.

Windshield wiper devices typically have a wiper arm or wiper lever, wherein a wiper blade is moved over the windshield of a motor vehicle. The wiper blade is moved here between a first turning position and a second turning position. For this purpose, the wiper arm is connected via a drive shaft to a wiper motor. In particular on windshields having pronounced changes in curvature, the wiper blade easily loses contact with the windshield. This may result, in particular in the case of windshields having a pronounced curvature, in wiping areas not being wiped or in smearing.

Since a wiping operation has to be optimized for a multiplicity of parameters, such as, for example, the amount of rain falling on the windshield, a possible snow loading occurring on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

There are a plurality of boundary conditions which should additionally be taken into consideration for improvement purposes. These include the outlay on production or the production costs, the material costs, but also the properties of the windshield wiper device, in particular the operation under diverse conditions and the durability under a multiplicity of conditions.

Customarily, the regular use of windshield wiper devices, in particular wiper blades, causes the occurrence of wear phenomena, which are associated with a deterioration in the wiping quality. Furthermore, the exposed position of windshield wiper devices on the front windshield or rear windshield of motor vehicles, in particular during passage through a washing system, gives rise to the risk of the windshield wiper device being damaged or even torn off. In these cases, the worn or damaged windshield wiper devices have to be exchanged. Conventionally, the exchange of windshield wiper devices is relatively complicated since the latter are customarily fastened to the drive shaft via screw connections.

SUMMARY OF THE INVENTION

It is the object of the present invention to provide a windshield wiper device with which at least one or more of the abovementioned disadvantages are reduced or essentially do not occur.

According to an aspect of the present invention, a windshield wiper device for a vehicle, with a fastening element, in particular for a motor vehicle, is proposed. The windshield wiper device comprises a mounting element, which is designed to be mounted on the fastening element, and a wiper blade with an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade. The connecting elements are designed in order to permit a movement of the upper part and the lower part relative to each other with a movement component along a longitudinal extent of the wiper blade. Furthermore, the wiper blade comprises a wiper-blade-side fastening part. The wiper-blade-side fastening part is configured in such a manner that, by means of a rotation of the wiper-blade-side fastening part relative to the mounting element, an engagement can be formed in order to connect the wiper-blade-side fastening part to the mounting element.

According to a further aspect of the present invention, a method for mounting a windshield wiper device is provided. The method comprises providing a windshield wiper device according to the embodiments described herein. Furthermore, the method comprises fastening the wiper-blade-side fastening part to the mounting element by forming an engagement of the wiper-blade-side fastening part with the mounting element. The wiper-blade-side fastening part is rotated here relative to the mounting element about an axis of rotation which runs substantially perpendicular to the longitudinal extent of the wiper blade.

Preferred embodiments and particular aspects of the invention emerge from the dependent claims, the drawings and the description here.

According to the windshield wiper device described herein in accordance with embodiments described herein and by the method for mounting the windshield wiper device, a windshield wiper device which can be mounted and dismounted in a simple manner is provided. The windshield wiper device, which is preferably of the fin-ray type, is mounted in a rotatory manner onto a mounting element, which is designed to be mounted on the fastening element of the vehicle, and is dismounted therefrom in a rotatory manner. Accordingly, in the event of damage, the windshield wiper device can be exchanged in a simple manner or removed in a simple manner before passage through a washing system, and subsequently mounted again. Furthermore, the rotatory mounting and dismounting has the advantage that the elements which are to be joined do not tilt, as may occur, for example, in axially parallel joining.

According to embodiments of the disclosure that may be combined with other embodiments described herein, the wiper-blade-side fastening part has at least one engagement element which is designed in order to form an engagement with at least one securing element of the mounting element. A windshield wiper device is therefore provided with which a position of the wiper-blade-side fastening part relative to the mounting element can be defined.

According to embodiments of the disclosure that may be combined with other embodiments described herein, the securing element is designed as a recess in the lateral surface of the mounting element. The windshield wiper device can therefore be produced simply and cost-effectively.

According to other embodiments of the disclosure that may be combined with other embodiments described herein, the mounting element has at least one engagement element which is designed in order to form an engagement with at least one securing element of the wiper-blade-side fastening part. A windshield wiper device is therefore provided with which a position of the wiper-blade-side fastening part relative to the mounting element can be defined.

According to embodiments of the disclosure that may be combined with other embodiments described herein, the securing element is designed as a recess in the lateral surface of the wiper-blade-side fastening part. The windshield wiper device can therefore be produced simply and cost-effectively.

According to embodiments of the disclosure that may be combined with other embodiments described herein, the mounting element and/or the wiper-blade-side fastening part are/is of cylindrical design. The windshield wiper device can therefore be produced simply and cost-effectively.

According to embodiments of the disclosure that may be combined with other embodiments described herein, an inside diameter of the wiper-blade-side fastening part substantially corresponds to an outside diameter of the mounting element. The wiper-blade-side fastening part can therefore be introduced or inserted into the mounting element, and therefore a position of the wiper-blade-side fastening part relative to the mounting element can be securely and stably defined.

According to other embodiments of the disclosure that may be combined with other embodiments described herein, an inside diameter of the mounting element substantially corresponds to an outside diameter of the wiper-blade-side fastening part. The mounting element can therefore be introduced or inserted into the wiper-blade-side fastening part, and therefore a position of the wiper-blade-side fastening part relative to the mounting element can be securely and stably defined.

According to embodiments of the disclosure that may be combined with other embodiments described herein, the securing element is of spiral design. The engagement during the mounting can therefore be securely and stably guided, and therefore a position of the wiper-blade-side fastening part relative to the mounting element can be securely and stably defined.

According to embodiments of the disclosure that may be combined with other embodiments described herein, the engagement element is designed in order to engage in the securing element and, by rotation of the wiper-blade-side fastening part relative to the mounting element, to be guided along the securing element. The engagement during the mounting can therefore be securely and stably guided, and therefore a position of the wiper-blade-side fastening part relative to the mounting element can be securely and stably defined.

According to embodiments of the disclosure that may be combined with other embodiments described herein, the engagement element is designed as a projection. The windshield wiper device can therefore be produced simply and cost-effectively.

BRIEF DESCRIPTION OF THE DRAWINGS

Exemplary embodiments of the invention are illustrated in the figures and are described in more detail below. In the figures.

DETAILED DESCRIPTION

The same reference signs are used below for identical elements and elements of identical effect, unless stated otherwise.

Figure 1:
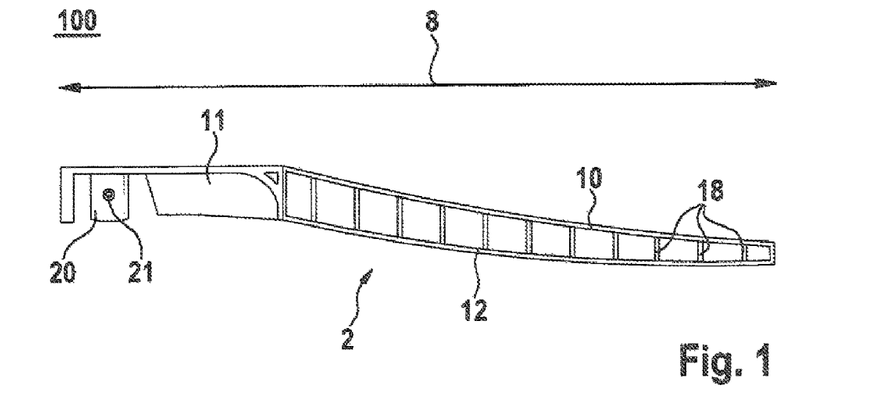
FIG. 1 shows a schematic illustration of a windshield wiper device according to embodiments of the disclosure in an unfastened state.
Figure 2:
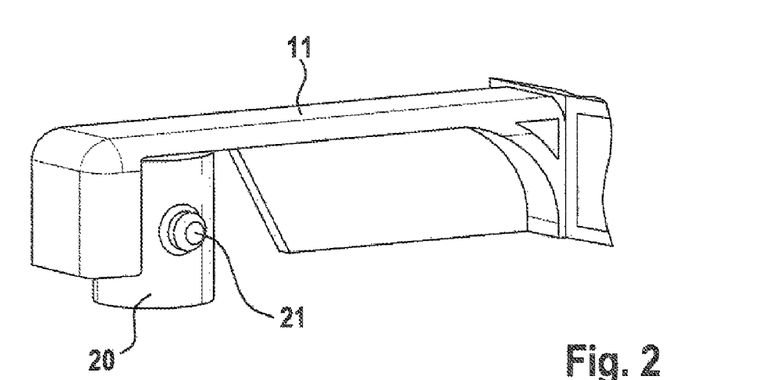
FIG. 2 shows a schematic illustration of the fastening device of the windshield wiper device according to FIG. 1 according to embodiments of the disclosure, in an unfastened state.

A windshield wiper device 100 according to embodiments of the disclosure is illustrated schematically in FIGS. 1 and 2. FIG. 1 shows the windshield wiper device 100 in an unfastened state, and FIG. 2 shows the fastening device 11 of the windshield wiper device 100 illustrated in FIG. 1.

According to embodiments of the disclosure, the windshield wiper device 100 comprises a fin-ray structure, a wiper-blade-side fastening part 20 and a mounting element.

According to embodiments of the disclosure, the windshield wiper device 100 comprises a wiper blade 2 with an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along a longitudinal extent 8 of the windshield wiper device 100. The connecting elements 18 are designed in order to permit a movement of the upper part 10 and the lower part 12 relative to each other with a movement component along a longitudinal extent 8 of the windshield wiper device 100.

According to embodiments of the disclosure that may be combined with other embodiments, the wiper blade 2 has a fastening device 11 with a wiper-blade-side fastening part 20 which is connectable to the mounting element. According to typical embodiments, the mounting element can be mounted on a vehicle. The wiper-blade-side fastening part 20 and the mounting element are configured such that, by means of a rotation of the wiper-blade-side fastening part 20 relative to the mounting element, an engagement can be formed in order to connect the wiper-blade-side fastening part 20 to the fastening element 50.

According to typical embodiments, the rotation during the fastening has an axis of rotation which is substantially parallel to the axis of rotation during the operation of the windshield wiper device. A bayonet-type closure is provided which, according to typical embodiments described here, permits simple mounting and dismounting of the windshield wiper device.

According to embodiments of the disclosure that may be combined with other embodiments, the wiper-blade-side fastening part 20 is of cylindrical design. The wiper-blade-side fastening part 20 can be at least partially formed here as a solid cylinder or at least partially as a hollow cylinder. According to the embodiments described herein, the wiper-blade-side fastening part 20 can therefore be produced particularly simply and cost-effectively.

As is illustrated by way of example in FIGS. 1 and 2, the wiper-blade-side fastening part 20, according to embodiments of the windshield wiper device 100 that may be combined with other embodiments, can have an engagement element 21. The engagement element 21 is typically designed in order to form an engagement with a securing element of the mounting element. According to embodiments described herein, the engagement element 21 can form an engagement with the securing element by means of a rotation about the axis of rotation which runs substantially perpendicular to the longitudinal extent 8 of the windshield wiper device 100.

The engagement element 21 is typically of circular design. According to some embodiments of the disclosure that may be combined with other embodiments, the engagement element 21 is designed as a projection. According to typical embodiments, the engagement element 21 is formed from a projection on a lateral surface of the wiper-blade-side fastening part 20. According to the embodiments described herein, the wiper-blade-side fastening part 20 can therefore be produced particularly simply and cost-effectively.

Figure 3:
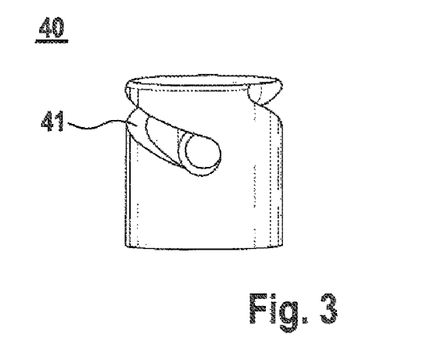
FIG. 3 shows a perspective view of the mounting element of the windshield wiper device according to embodiments of the disclosure.

FIG. 3 shows a perspective view of the mounting element 40 of the windshield wiper device 100 according to embodiments of the disclosure.

Figure 4:
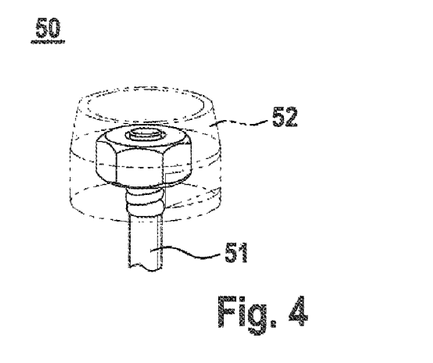
FIG. 4 shows a drive device of the vehicle with a fastening element.

According to embodiments of the disclosure that may be combined with other embodiments, the mounting element 40 is designed to be mounted on the fastening element of the vehicle, as is shown in FIG. 4. According to typical embodiments, the mounting element 40 comprises a securing element 41.

According to embodiments of the disclosure that may be combined with other embodiments, the mounting element 40 is of cylindrical design. The mounting element 40 is typically at least partially designed as a hollow cylinder.

According to typical embodiments, the securing element 41 is designed as a recess in the lateral surface of the mounting element 40. For example, the securing element 41 can be formed on an inner lateral surface of the securing element 41. According to some embodiments, if the mounting element 40 is at least partially designed as a hollow cylinder, the recess can extend from the inner lateral surface to the outer lateral surface, i.e. can be continuous, as is shown by way of example in FIG. 3. Therefore, according to the embodiments described herein, the securing element 41 can be produced particularly simply and cost-effectively.

According to embodiments of the disclosure that may be combined with other embodiments, the securing element 41 is of spiral design. As is shown by way of example in FIG. 3, the securing element 41 is designed as a spiral recess in the lateral surface of the mounting element 40. According to some embodiments, a spiral axis is substantially parallel to the axis of rotation which runs substantially perpendicular to the longitudinal extent 8 of the windshield wiper device 100. According to typical embodiments, the recess is open toward an upper side of the mounting element 40, and therefore the engagement element 21 of the wiper-blade-side fastening part 20 can engage at this point.

According to embodiments of the disclosure that may be combined with other embodiments, the engagement element 21 is designed in order to engage in the securing element 41 and, by rotation of the wiper-blade-side fastening part 20 relative to the mounting element 40, to be guided along the securing element 41. Therefore, according to the embodiments described herein, a particularly effective and stable fastening device can be provided for a windshield wiper device 100. For example, a latching position can be provided in the spiral engagement element, and therefore a stable mounting state is achieved in an operating position.

According to embodiments of the disclosure that may be combined with other embodiments, the wiper-blade-side fastening part 20 and the mounting element 40 are of cylindrical design. According to typical embodiments, an inside diameter of the wiper-blade-side fastening part 20 substantially corresponds to an outside diameter of the mounting element 40. The wiper-blade-side fastening part 21 can therefore be inserted or introduced into the mounting element 40 during the mounting. Therefore, according to the embodiments described herein, a particularly effective and stable fastening device for a windshield wiper device 100 can be provided.

According to other embodiments of the disclosure that may be combined with other embodiments, the wiper-blade-side fastening part 20 and the mounting part 40 are of cylindrical design. According to typical embodiments, an inside diameter of the mounting element 40 substantially corresponds to an outside diameter of the wiper-blade-side fastening part 20. The mounting element 40 can therefore be inserted or introduced into the wiper-blade-side fastening part 21 during the mounting. Therefore, according to the embodiments described herein, a particularly effective and stable fastening device for a windshield wiper device 100 can be provided.

According to typical embodiments, the engagement element 21 is guided during the rotation for the mounting along the securing element 41 as far as a stop position. For example, the engagement element 21 is guided along the securing element 41 of spiral design as far as a stop position. The stop position here can be an end of the securing element 41 against which the engagement element 41 strikes or lies such that further rotation of the wiper-blade-side fastening part 20 relative to the mounting element 40 is prevented. Therefore, according to the embodiments described herein, a particularly effective and stable fastening device for a windshield wiper device can be provided.

According to other embodiments of the disclosure that may be combined with other embodiments, the securing element is designed as a recess in the lateral surface of the wiper-blade-side fastening part, and the engagement element is formed on the mounting element. For example, the engagement element is formed on an inner lateral surface of the mounting element, which is at least partially designed as a hollow cylinder, and the securing element is designed as a recess in the lateral area of the engagement element. The description provided with reference to FIGS. 1 to 4 applies analogously here.

FIG. 4 shows a wiper drive device 50 of the vehicle with a fastening element 52 and a drive shaft 51. As is shown in FIG. 4, the fastening element 52 is fixed or fastened on the drive shaft 51. According to embodiments of the disclosure that may be combined with other embodiments, the mounting element 40 is designed to be connected to the fastening element 52. In particular, the mounting element 40 is designed to be mechanically connected to the fastening element 52 or to be fastened thereto such that the rotational movement of the drive shaft 51 is transmitted to the mounting element 40 and therefore to the wiper blade 2. According to embodiments, the fastening of the mounting element 50 to the fastening element 52 can be undertaken by a force-fitting connection and/or interlocking connection. According to further embodiments, the mounting element 40 can also be mounted directly onto the drive shaft 51. In such an embodiment, the fastening element 52, for example, can be dispensed with.

Figure 5:
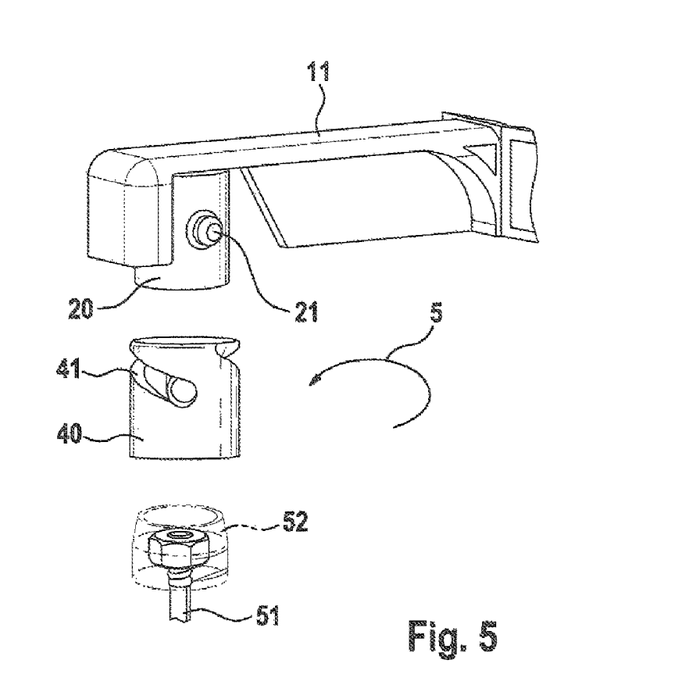
FIG. 5 shows a schematic illustration of the mounting of the windshield wiper device according to embodiments of the disclosure.
Figure 6:
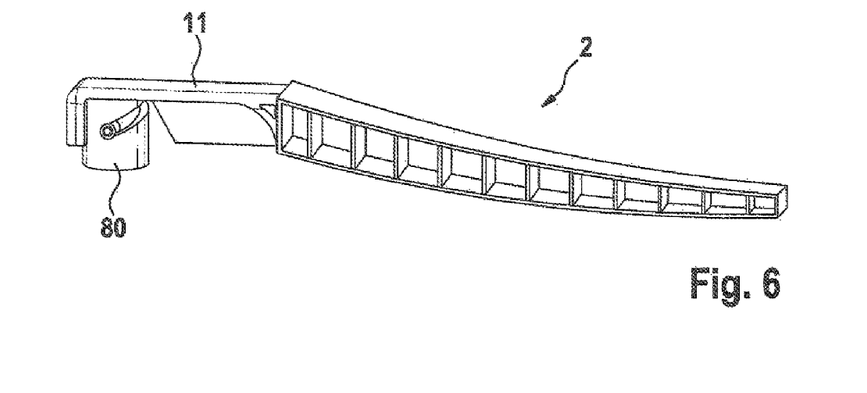
FIG. 6 shows a schematic illustration of the windshield wiper device according to embodiments of the disclosure, in a fastened state.

FIG. 5 shows a schematic illustration of the mounting of the windshield wiper device 100 according to embodiments of the disclosure. FIG. 6 shows a schematic illustration of the windshield wiper device 100 in a fastened state after the mounting.

According to embodiments that may be combined with other embodiments, the wiper-blade-side fastening part 20 and the mounting element 40 are configured such that, by rotation of the wiper-blade-side fastening part 20 relative to the mounting element 40 about the axis of rotation, a position of the wiper-blade-side fastening part 20 relative to the mounting element 40 can be defined. According to embodiments, the axis of rotation is substantially perpendicular to the longitudinal extent 8 of the windshield wiper device 100 and substantially perpendicular to a working or wiping plane of the wiper blade 2. According to some embodiments, the axis of rotation is substantially perpendicular to a windshield of the vehicle. The direction of rotation is indicated with the arrow 5 in FIG. 5.

According to embodiments of the disclosure that may be combined with other embodiments, for the mounting of the wiper blade 2 on the mounting element 40 by means of a rotation of the wiper-blade-side fastening part 20 relative to the mounting element 40, an engagement is formed between the wiper-blade-side fastening part 20 and the mounting element 40 in order to connect the wiper-blade-side fastening part 20 to the mounting element 40. For the dismounting, the connection between the wiper-blade-side fastening part 20 and the mounting element 40 is released by means of a rotation which is opposed to the rotation for the mounting.

As is shown in FIG. 5, according to typical embodiments, during the mounting of the windshield wiper device 100 the wiper-blade-side fastening part 20 is inserted into the mounting element 40. In the process, the engagement element 21 of the wiper-blade-side fastening part 21 engages in the securing element 41. By means of the rotation of the wiper-blade-side fastening part 20 relative to the mounting element 40, the engagement element 21 is guided along the securing element 41. According to typical embodiments, the engagement element 21 is guided along the securing element 41 as far as a stop position. In the example shown in FIG. 5, the engagement element 21 is guided along the securing element 41, which is of a spiral design, as far as a stop position. The stop position here can be an end of the securing element 41 against which the engagement element 41 strikes or lies such that further rotation of the wiper-blade-side fastening part 20 relative to the mounting element 40 is prevented. Therefore, according to the embodiments described herein, a particularly effective and stable fastening device for a windshield wiper device 100 can be provided.

By means of the embodiments described herein, a windshield wiper device is therefore provided which can be mounted and dismounted in a simple manner. Accordingly, the windshield wiper device can easily be exchanged in the event of damage or removed in a simple manner before passage through a washing system and subsequently mounted again. Furthermore, a tilting of the elements to be joined, as may occur, for example, in axially parallel mounting or joining, can be avoided.

Illustrative embodiments of wiper systems for which the windshield wiper device described herein can be advantageously used are described below. In principle, however, the fastening device described herein may also be used for other windshield wiper devices.

Figure 7:
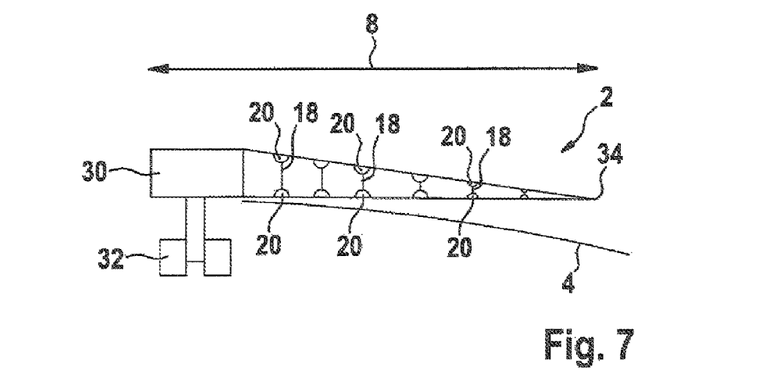
FIG. 7 shows a schematic illustration of a further exemplary embodiment of a windshield wiper device according to the invention in the form of a wiper arm with an integrated wiper blade in a basic position.
Figure 8:
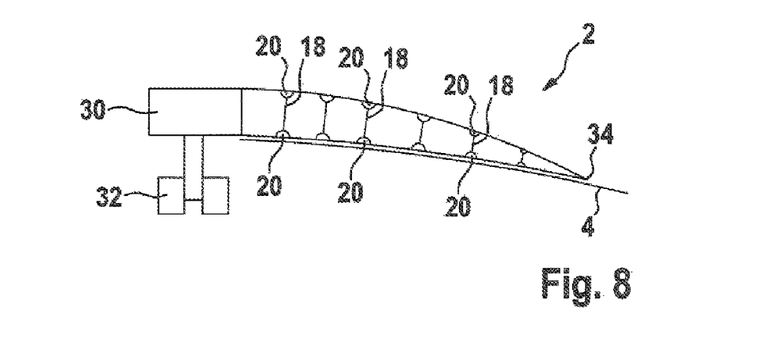
FIG. 8 shows a schematic illustration of the wiper arm with an integrated wiper blade according to FIG. 7 in a position placed against a windshield.

FIGS. 7 and 8 show schematic illustrations of a wiper blade 2 in a basic position (FIG. 7) and in a position placed against a windshield 4 (FIG. 8) according to embodiments of the windshield wiper device 100 of the disclosure. The wiper blade 2 serves for wiping a windshield 4 of a vehicle, which is, for example, a motor vehicle, in particular a car. The wiper blade 2 is customarily attached to a windshield wiper arm which is driven for wiping purposes by means of a motor. For this purpose, the wiper blade 2 has a holder at which it can be fastened to the windshield wiper arm. In FIG. 7, the wiper blade 2 is in a basic position in which it is at least partially lifted off the windshield 4. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are bendable beams or may be configured as bendable beams which, in FIGS. 7 and 8, are in an exemplary manner in each case formed in one piece. This makes it possible to realize a particularly stable construction. It is likewise possible for in each case only one part of the upper part 10 and/or the lower part 12 to be configured to be bendable. Furthermore, it is alternatively possible for the upper part 10 to be configured in multiple parts.

According to some embodiments that may be combined with the other embodiments described here, a material that has a modulus of elasticity in a range between 0.005 kN/mm$^2$ and 0.5 kN/mm$^2$, in particular 0.01 kN/mm$^2$ and 0.1 kN/mm$^2$, is used for the upper part 10 and/or the lower part 12. This makes it possible to realize suitable bendability of the upper part 10 and of the lower part 12. Together with a suitably configured cross-sectional area of the upper part 10 and of the lower part 12, optimum flexural rigidity is thus attained. The upper part 10 and the lower part 12 are arranged so as to be situated opposite each other. One end of the upper part 10 is fixedly connected at an outer connecting position 34 to one end of the lower part 12. The upper part 10 and the lower part 12 are otherwise spaced apart from each other.

The upper part 10 and the lower part 12 are connected to each other by connecting elements 18.

In particular in the basic position of the wiper blade 2, said connecting elements run approximately transversely with respect to the longitudinal extent 8 of the wiper blade 2. The connecting elements 18 are fastened by means of rotary joints 20 to mutually facing inner longitudinal sides of the upper part 10 and of the lower part 12. The rotary joints 20 are hinges here. In particular, the rotary joints 20 may be in the form of film hinges. This is advantageous in particular if upper part 10, lower part 12 and/or connecting elements 18 are produced from a plastics material or are coated with a suitable plastics material.

According to typical embodiments described here that may be combined with other embodiments described here, a rotary joint is selected from the following group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

Embodiments in which the joint is provided by a film hinge thus constitute a very simple means for providing the joints for a fin-ray wiper. The wiper blade 2 may be provided in one piece, in particular in ready-from-the-mold form. According to typical embodiments, the windshield wiper device, in particular the wiper blade, is produced from one or more materials from a group consisting of: TPE (thermoplastic elastomer), for example TPE-S, TPE-O, TPE-U, TPE-A, TPE-V and TPE-E. The film hinges can exhibit high ductility. This may be realized for example by means of a material selected from the group PP, PE, POM and PA.

Alternatively, the film hinges may be produced from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent of the wiper blade 2. The spacings between two respective adjacent connecting elements 18 are uniform. Said spacings may, however, also be selected so as to differ. The spacings are advantageously less than 50 mm, in particular less than 30 mm. In this way, it is possible to ensure particularly great flexibility of the windshield wiper device, in particular of its lower part, and good adaptation to the curvature and changes in curvature of the windshield to be wiped.

In particular in the basic position of the wiper blade 2, the connecting elements 18 are fastened to the lower part 12 such that the longitudinal axes of said connecting elements run at angles 26 of between 65° and 115°, in particular between 75° and 105°, with respect to the lower part 12. The angles particularly advantageously lie between 80° and 100°. This advantageously ensures particularly good transmission of a force, which acts on the lower part, to the upper part. Furthermore, a particularly stable windshield wiper device can be realized in this manner. Corresponding statements apply to the points at which the connecting elements 18 are fastened to the upper part 10.

The spacings between the upper part 10 and the lower part 12 are defined primarily by the lengths of the connecting elements 18. The lengths of the connecting elements 18 increase from the outer connecting position as far as approximately the locations at which a fastening part 30 begins. In this way, in the side view of the wiper blade 2 as per FIG. 6, the upper part 10 and the lower part 12 form a wedge. The connecting elements 18 are designed to be resistant to buckling.

FIG. 8 shows a schematic illustration of the wiper blade 2 as per FIG. 7 in a position in which said wiper blade is placed against the windshield 4. Since the windshield 4 has a curvature, contact pressure forces are exerted on the lower part 12 when the wiper blade 2 is placed against the windshield 4. Since the upper part 10 and the lower part 12 are bendable beams and the connecting elements 18 are mounted rotatably on upper part 10 and lower part 12, the upper part 10 and the lower part 12 are displaceable relative to each other. Owing to the compressive forces acting on the lower part 12 from below, the wiper blade 2 bends in the direction from which the compressive forces originate, and is placed precisely against the curvature of the windshield 4.

Owing to the construction of the embodiments described here, when a force is exerted on the lower part (by the windshield 4), the lower part bends in the direction from which the force acts. This is the case owing to the connection of the upper part 10 and of the lower part at a connecting position 14 and/or 16, the shape, and owing to rotary joints at the connection between the connecting elements and the upper and lower parts respectively.

In the illustration as per FIG. 8, there is a small spacing between the wiper blade 2 and the windshield 4, which small spacing serves here merely for the illustration of the windshield 4 and of the wiper blade 2 and, in reality, is substantially not present when the wiper blade 2 is placed against the windshield 4. Furthermore, a wiper lip which is placed onto the windshield 4 for wiping purposes is typically located on the lower side, which faces away from the upper part 10, of the lower part 12. For reasons of clarity, the wiper lip is not illustrated in FIGS. 7 and 8.

A windshield wiper device according to embodiments described here uses the effect of tail fins of certain fish, which under the action of lateral pressure do not deflect in the direction of pressure but instead arch in the opposite direction, that is to say in the direction from which the pressure originates. This principle is also referred to as the "fin-ray" principle. In this way, a windshield wiper device according to the embodiments described herein has the advantage of improved adaptation to a windshield of a motor vehicle. In the case of a conventional windshield wiper blade, the upper part thereof is normally rigid, that is to say is not of bendable design.

FIGS. 7 and 8 show a wiper blade 2 with a longitudinal extent 8. The windshield wiper device has only one connecting position 34. Such an arrangement is frequently used for rear windshield wipers. However, the disclosure is not restricted to rear windshield wipers, and the windshield wiper device according to the embodiments described here may also be used for front windshield wipers. Optional refinements and details described in the individual embodiments may generally be used for both variants of an arrangement of a windshield wiper device.

FIGS. 7 and 8 furthermore show a fastening part 30 to which the wiper blade 2 is attached. The fastening part 30 is connected to a wiper motor 32 which drives the fastening part 30 for the purpose of wiping the windshield 4. The fastening part 30 may be configured according to the embodiments of the present disclosure.

The wiper blade 2 is configured in a wedge-shaped manner, with one end of the upper part 10 being fixedly connected at an outer connecting position 34 to one end of the lower part 12. The respective other end of the upper part 10 and of the lower part 12 are fastened to the fastening part 30.

In FIG. 7, the wiper blade 2 is illustrated in its position in which it is not placed against the windshield, such that the lower part 12 is of substantially rectilinear design. According to yet further embodiments that may be combined with other embodiments, the lower part in the unloaded state is of convex design, that is to say has a curvature that projects away from the upper part in a central region. The windshield wiper device according to the embodiments described here may then typically, upon making contact with a windshield and proceeding from the convex shape of the lower part, adopt the corresponding concave shape of the lower part that adapts to the windshield.

Figure 9:
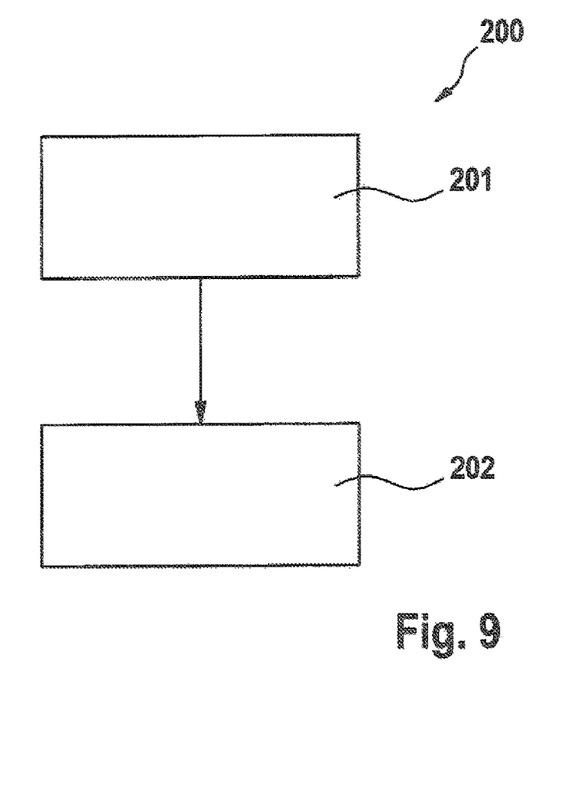
FIG. 9 shows a sequence diagram for illustrating embodiments of the method for mounting a windshield wiper device according to embodiments of the disclosure.

In order to illustrate embodiments of the method 200 for mounting a windshield wiper device 100, a sequence diagram is illustrated in FIG. 9. According to embodiments of the method 200, the method 200 comprises providing 201 a windshield wiper device according to the embodiments described herein. Furthermore, the method comprises connecting 202 the wiper-blade-side fastening part to the mounting element by forming an engagement of the wiper-blade-side fastening part with the mounting element by rotation of the wiper-blade-side fastening part relative to the mounting element about an axis of rotation in order to connect the wiper-blade-side fastening part to the mounting element.

The connecting element 18, in particular outside its rotary joints 20 (FIGS. 7 and 8), has a thickness which is greater than or equal to 0.4 millimeter. In particular, this thickness is less than 3 millimeters, preferably between 0.6 millimeter and 2 millimeters, ideally approximately 1 millimeter to 1.7 millimeters, for example approximately 1.5 millimeters.

Furthermore, the connecting elements are of substantially buckle-proof or flexurally rigid design. This means that the latter are designed in such a manner that they permit a movement of the upper part 10 and of the lower part 12 relative to each other with a movement component along the longitudinal extent 8 of the wiper blade 2. In this case, the connecting elements are connected to the upper part 10 at a respective upper connecting position and to the lower part 12 at a respective lower connecting position. For example, a rotary joint 20 is provided at each of the connecting positions. During a movement of the upper part 10 of the lower part 12 relative to each other, the distance of an upper connecting position from a lower connecting position on the same connecting element substantially does not change, i.e. the distance is constant with deviations of, for example, ±1 mm, in particular ±0.3 mm.

The embodiments described herein of the windshield wiper device and the method for mounting the windshield wiper device therefore provide a windshield wiper device which can be mounted and dismounted in a simple manner. Accordingly, the windshield wiper device can easily be exchanged in the event of damage or can be removed in a simple manner before passage through a washing system and subsequently mounted again.

What is claimed is:

1. A windshield wiper device (100) for a vehicle, with a fastening element (52), comprising
    a mounting element (40), which is configured to be mounted on the fastening element (52), and
    a wiper blade (2) with
        an elongate upper part (10), which is configured to be at least partially bendable,
        an elongate lower part (12), which is configured to be at least partially bendable,
        a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured in order to permit a movement of the upper part (10) and of the lower part relative to each other with a movement component along the longitudinal extent (8) of the wiper blade (2), wherein the connecting elements (18) substantially have a thickness of greater than or equal to 0.4 millimeter,
        a wiper-blade-side fastening part (20), wherein the wiper-blade-side fastening part (20) is configured such that, by means of a rotation of the wiper-blade-side fastening part (20) relative to the mounting element (40) a portion of the wiper blade-side fastening part (20) extends into and rotates relative to the mounting element (40), and an engagement can be formed in order to connect the wiper-blade-side fastening part (20) to the mounting element (40), wherein the entire wiper blade is configured to rotate to form the engagement and connect the wiper blade-side fastening part (20) to the mounting element (40), wherein the wiper-blade-side fastening part (20) has at least one engagement element (21) which is configured in order to form an engagement with at least one securing element (41) of the mounting element (40), and wherein the at least one securing element (41) is of spiral shape.

2. The windshield wiper device (100) as claimed in claim 1, wherein the securing element (41) is configured as a recess in a lateral surface of the mounting element (40).

3. The windshield wiper device (100) as claimed in claim 1, wherein the mounting element (40) has at least one engagement element which is configured in order to form an engagement with at least one securing element of the wiper-blade-side fastening part (20).

4. The windshield wiper device (100) as claimed in claim 3, wherein the securing element is configured as a recess in a lateral surface of the wiper-blade-side fastening part (20).

5. The windshield wiper device (100) as claimed in claim 1, wherein the mounting element (40) is of cylindrical shape.

6. The windshield wiper device (100) as claimed in claim 5, wherein an inside diameter of the wiper-blade-side fastening part (21) substantially corresponds to an outside diameter of the mounting element (40).

7. The windshield wiper device (100) as claimed in claim 5, wherein an inside diameter of the mounting element (40) substantially corresponds to an outside diameter of the wiper-blade-side fastening part (21).

8. The windshield wiper device (100) as claimed in claim 1, wherein the engagement element (21) is configured in order to engage in the securing element (41) and, by rotation of the wiper-blade-side fastening part (20) relative to the mounting element (40), to be guided along the securing element (41).

9. The windshield wiper device (100) as claimed in claim 1, wherein the engagement element (21) is configured as a projection.

10. A method (200) for mounting a windshield wiper device, comprising:
    providing (201) a windshield wiper device (100) as claimed in claim 1, and
    fastening (202) the wiper-blade-side fastening part (20) to the mounting element (40) by forming an engagement of the wiper-blade-side fastening part (20) with the mounting element (40) and rotating the wiper-blade-side fastening part (20) relative to the mounting element (40) about an axis of rotation which runs substantially transversely with respect to the longitudinal extent (8) of the wiper blade (2).

11. The windshield wiper device (100) as claimed in claim 1, wherein the wiper-blade-side fastening part (21) is of cylindrical shape.

12. The windshield wiper device (100) as claimed in claim 11, wherein the mounting element (40) is of cylindrical shape.

13. The windshield wiper device (100) as claimed in claim 1, wherein the mounting element (40) includes a hollow cylindrical-shaped body that includes a securing element (41) in the form of a spiral-shaped cut-out along the hollow body, the spiral-shaped cut-out being open toward a top side of the mounting element (40).

14. The windshield wiper device (100) as claimed in claim 13, wherein the cut-out extends entirely through a wall of the hollow body.

15. The windshield wiper device (100) as claimed in claim 1, further comprising a drive shaft (51) and a fastening element (52) coupled to an end of the drive shaft (51), wherein the mounting element (40) is coupled to the fastening element (52), and wherein the entire wiper blade is configured to rotate about an axis defined by the drive shaft (51) to form the engagement and connect the wiper blade-side fastening part (20) to the mounting element (40).

16. The windshield wiper device (100) as claimed in claim 1, wherein the wiper blade-side fastening part (20) extends as a projection from the end of the wiper blade.

17. The windshield wiper device (100) as claimed in claim 1, wherein the mounting element (40) defines a drive axis, and wherein the wiper blade-side fastening part (20) is configured to rotate about the drive axis during the engagement.

18. A windshield wiper device (100) for a vehicle, with a fastening element (52), comprising
- a mounting element (40), which is configured to be mounted on the fastening element (52), wherein the mounting element (40) includes a hollow cylindrical-shaped body that includes a securing element (41) in the form of a spiral-shaped cut-out along the hollow body, the spiral-shaped cut-out being open toward a top side of the mounting element (40), and
- a wiper blade (2) with
  - an elongate upper part (10), which is configured to be at least partially bendable,
  - an elongate lower part (12), which is configured to be at least partially bendable,
  - a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured in order to permit a movement of the upper part (10) and of the lower part relative to each other with a movement component along the longitudinal extent (8) of the wiper blade (2), wherein the connecting elements (18) substantially have a thickness of greater than or equal to 0.4 millimeter,
  - a wiper-blade-side fastening part (20), wherein the wiper-blade-side fastening part (20) is configured such that, by means of a rotation of the wiper-blade-side fastening part (20) relative to the mounting element (40) a portion of the wiper blade-side fastening part (20) extends into and rotates relative to the mounting element (40), and an engagement can be formed in order to connect the wiper-blade-side fastening part (20) to the mounting element (40), wherein the entire wiper blade is configured to rotate to form the engagement and connect the wiper blade-side fastening part (20) to the mounting element (40), wherein the mounting element (40) includes a hollow cylindrical-shaped body that includes a securing element (41) in the form of a spiral-shaped cut-out along the hollow body, the spiral-shaped cut-out being open toward a top side of the mounting element (40).

19. A windshield wiper device (100) for a vehicle, with a fastening element (52), comprising
- a mounting element (40), which is configured to be mounted on the fastening element (52),
- a wiper blade (2) with
  - an elongate upper part (10), which is configured to be at least partially bendable,
  - an elongate lower part (12), which is configured to be at least partially bendable,
  - a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured in order to permit a movement of the upper part (10) and of the lower part relative to each other with a movement component along the longitudinal extent (8) of the wiper blade (2), wherein the connecting elements (18) substantially have a thickness of greater than or equal to 0.4 millimeter,
  - a wiper-blade-side fastening part (20), wherein the wiper-blade-side fastening part (20) is configured such that, by means of a rotation of the wiper-blade-side fastening part (20) relative to the mounting element (40) a portion of the wiper blade-side fastening part (20) extends into and rotates relative to the mounting element (40), and an engagement can be formed in order to connect the wiper-blade-side fastening part (20) to the mounting element (40), wherein the entire wiper blade is configured to rotate to form the engagement and connect the wiper blade-side fastening part (20) to the mounting element (40), and
- a drive shaft (51) and a fastening element (52) coupled to an end of the drive shaft (51), wherein the mounting element (40) is coupled to the fastening element (52), and wherein the entire wiper blade is configured to rotate about an axis defined by the drive shaft (51) to form the engagement and connect the wiper blade-side fastening part (20) to the mounting element (40).

* * * * *